(12) United States Patent
Enberg et al.

(10) Patent No.: US 12,472,626 B2
(45) Date of Patent: Nov. 18, 2025

(54) METHOD OF CONTROLLING MANIPULATOR OF INDUSTRIAL ROBOT, CONTROL SYSTEM AND INDUSTRIAL ROBOT

(71) Applicant: ABB Schweiz AG, Baden (CH)

(72) Inventors: Markus Enberg, Västerås (SE); Hans Andersson, Västerås (SE); Mikael Norrlöf, Norrköping (SE); Jakob Weström, Västerås (SE)

(73) Assignee: ABB Schweiz AG, Baden (CH)

( * ) Notice: Subject to any disclaimer, the term of this patent is extended or adjusted under 35 U.S.C. 154(b) by 252 days.

(21) Appl. No.: 18/263,911

(22) PCT Filed: Feb. 11, 2021

(86) PCT No.: PCT/EP2021/053312
§ 371 (c)(1),
(2) Date: Aug. 2, 2023

(87) PCT Pub. No.: WO2022/171283
PCT Pub. Date: Aug. 18, 2022

(65) Prior Publication Data
US 2024/0083028 A1  Mar. 14, 2024

(51) Int. Cl.
*B25J 9/16* (2006.01)
(52) U.S. Cl.
CPC ........... *B25J 9/1664* (2013.01); *B25J 9/1638* (2013.01)
(58) Field of Classification Search
CPC ...... B25J 9/1664; B25J 9/1638; B25J 9/1628; B25J 9/163; B25J 9/1633; B25J 9/1656;
(Continued)

(56) References Cited

U.S. PATENT DOCUMENTS

2011/0257787 A1  10/2011  Sato et al.
2016/0297073 A1*  10/2016  Whalen-Robinson ........................ B25J 9/1633
(Continued)

FOREIGN PATENT DOCUMENTS

| CN | 101195221 A | 6/2008 |
| CN | 109623810 A | 4/2019 |
| GB | 2574297 A | 12/2019 |
| JP | 2001306118 A | 11/2001 |

(Continued)

OTHER PUBLICATIONS

Shiller et al; Robot Path Planning With Obstacles, Actuator, Gripper, and Payload Constraints; International Journal of Robotics Research; Sage Science Press; Thousand Oaks, US; vol. 8, No. 6; Dec. 1, 1989; 16 Pages.

(Continued)

*Primary Examiner* — Abby Lin
*Assistant Examiner* — Esvinder Singh
(74) *Attorney, Agent, or Firm* — Whitmyer IP Group LLC

(57) ABSTRACT

A method of controlling a manipulator of an industrial robot having a plurality of joints, the method including providing a candidate trajectory for the manipulator; determining at least one position dependent load value representative of at least one position dependent load acting on the manipulator for the candidate trajectory; modifying the candidate trajectory based on the at least one position dependent load value to provide a modified trajectory; and executing the modified trajectory by the manipulator. A control system for controlling a manipulator of an industrial robot having a plurality of joints, and an industrial robot including a manipulator and a control system, are also provided.

17 Claims, 3 Drawing Sheets

(58) Field of Classification Search
CPC ......... B25J 9/1674; G05B 2219/39247; G05B 2219/39364; G05B 19/404; G05B 2219/37076; G05B 2219/37086; G05B 2219/39067; G05B 2219/39112; G05B 2219/42304; G05B 2219/43099; G05B 2219/41114
See application file for complete search history.

(56) References Cited

U.S. PATENT DOCUMENTS

| | | | | |
|---|---|---|---|---|
| 2020/0061820 A1* | 2/2020 | McDaniel | ............. | B25J 9/1671 |
| 2021/0213608 A1* | 7/2021 | Hosomi | ................ | B25J 13/088 |
| 2022/0032460 A1* | 2/2022 | Hosomi | ................ | B25J 9/1638 |

FOREIGN PATENT DOCUMENTS

| | | | |
|---|---|---|---|
| WO | 2019186146 A1 | 10/2019 | |
| WO | 2020186146 A1 | 9/2020 | |

OTHER PUBLICATIONS

PCT International Search Report and Written Opinion of the International Searching Authority; Application No. PCT/EP2021/053312; Completed: Oct. 18, 2021; Mailing Date: Oct. 26, 2021; 12 Pages.
International Preliminary Report on Patentability; Application No. PCT/EP2021/053312; Issued: Aug. 15, 2023; 8 Pages.
Chinese First Office Action; Application No. 2021800921917; Completed Jun. 19, 2025; 17 Pages.

\* cited by examiner

METHOD OF CONTROLLING MANIPULATOR OF INDUSTRIAL ROBOT, CONTROL SYSTEM AND INDUSTRIAL ROBOT

TECHNICAL FIELD

The present disclosure generally relates to control of a manipulator. In particular, a method of controlling a manipulator of an industrial robot having a plurality of joints, a control system for controlling a manipulator of an industrial robot having a plurality of joints, and an industrial robot comprising a manipulator and a control system, are provided.

Background

An industrial robot may comprise a manipulator and a control system for controlling movements of the manipulator in accordance with a robot program. The structural integrity of mechanical components of the manipulator is highly dependent on a payload and a reach of the manipulator. Examples of such mechanical components are links and bearings of the manipulator. A payload may be an object carried by a tool of the manipulator. Both payload and reach limit the structural integrity of the mechanical components of the manipulator as well in static load cases as in dynamic load cases.

A high number of design choices that influence structural integrity and lifetime are available when designing a manipulator. For each mechanical component, a maximum static load and one or more maximum dynamic loads may be specified having regard to a lifetime of the mechanical component. A mechanical component of a manipulator may for example be constructed to be subjected to a high load at low speeds and a significantly lower load at high speeds. These limits need to be taken into consideration when controlling movements of the manipulator. In some prior art solutions, a worst case constant limit is chosen for each mechanical component. Such limits thereby significantly reduce a workspace of the manipulator at high payloads and significantly reduce a maximum payload that can be carried by the manipulator.

WO 2019186146 A1 discloses a system for robot and human collaboration. The system comprises a multi-axis robot; one or more torque sensors, each torque sensor being configured to measure a torque about a respective axis of the multi-axis robot; and a controller configured to receive one or more torque measurements taken by the one or more torque sensors, compare the one or more torque measurements or a function of the one or more torque measurements to a threshold value, and control the multi-axis robot based on the comparison.

In some prior art industrial robots, respective maximum values are defined for each of payload, speed, acceleration and position for a particular manipulator. Although these maximum values may ensure that the maximum total loads on the mechanical components of the manipulator are not exceeded and ensure that a particular payload can be used with a particular speed and a particular acceleration at each position within a given workspace, these maximum values and the workspace are too conservative in many situations. This therefore represents a dimensioning based on a worst case scenario leading to that the full potential of the manipulator is not utilized.

SUMMARY

One object of the present disclosure is to provide a method of controlling a manipulator of an industrial robot, which method enables one or more performance parameters of the manipulator to be increased without reducing lifetime of mechanical components of the manipulator. A more particular object of the present disclosure is to provide a method of controlling a manipulator of an industrial robot, which method enables a workspace of the manipulator to be extended without reducing lifetime of mechanical components of the manipulator.

A further object of the present disclosure is to provide a method of controlling a manipulator of an industrial robot, which method is effective.

A still further object of the present disclosure is to provide a method of controlling a manipulator of an industrial robot, which method is flexible.

A still further object of the present disclosure is to provide a method of controlling a manipulator of an industrial robot, which method is less complicated.

A still further object of the present disclosure is to provide a method of controlling a manipulator of an industrial robot, which method can be carried out in real time.

A still further object of the present disclosure is to provide a method of controlling a manipulator of an industrial robot, which method is cost-effective.

A still further object of the present disclosure is to provide a method of controlling a manipulator of an industrial robot, which method solves several or all of the foregoing objects in combination.

A still further object of the present disclosure is to provide a control system for controlling a manipulator of an industrial robot, which control system solves one, several or all of the foregoing objects.

A still further object of the present disclosure is to provide an industrial robot comprising a manipulator and a control system, which industrial robot solves one, several or all of the foregoing objects.

According to one aspect, there is provided a method of controlling a manipulator of an industrial robot having a plurality of joints, the method comprising providing a candidate trajectory for the manipulator; determining at least one position dependent load value representative of at least one position dependent load acting on the manipulator for the candidate trajectory; modifying the candidate trajectory based on the at least one position dependent load value to provide a modified trajectory; and executing the modified trajectory by the manipulator.

The method is based on the fact that a maximum total load that is acceptable in view of lifetime of a mechanical component is not static. Instead, the maximum total load depends on to what extent position dependent loads contribute to the total load. Dynamic loads on the mechanical components of the manipulator are typically more critical than static loads. Due to the dynamic behavior of the manipulator, a mechanical component is more likely to break by mechanical fatigue than by reaching a maximum static load. For many mechanical components, the lifetime depends on a combination of speed and torque. For example, a permissible tilting load on a bearing may be relatively low at dynamic conditions and relatively high near static conditions. A higher total load can therefore be allowed if the position dependent loads constitute a relatively large part of the total load.

By providing the modified trajectory based on the at least one position dependent load value determined for the candidate trajectory, the method in many cases enables additional trajectories to be executed by the manipulator, without compromising lifetime of mechanical components of the manipulator, for a given rating of the manipulator. The method enables a workspace of the manipulator to be extended and/or the manipulator to carry a heavier payload, although at a lower performance, but without reducing lifetime of mechanical components of the manipulator. Examples of such mechanical components are links, bearings, gearboxes and motors of the manipulator. In case the modified trajectory is partly or fully within an extended workspace, previously prevented by prior art control solution, the performance of the manipulator may be limited in the extended workspace, e.g. by limiting payload, speeds and/or accelerations in the extended workspace.

When the position dependent load is within a margin to a maximum position dependent load representative of the maximum static load on a mechanical component with respect to a dimensioned lifetime of the mechanical component, a total load on the mechanical component (including the position dependent loads, speed dependent loads and acceleration dependent loads) can be increased to allow additional force or torque until reaching a maximum total load of the mechanical component with respect to the dimensioned lifetime of the mechanical component. By increasing the total load in this way, the amount of force and torque available to speed dependent terms and acceleration dependent terms can be increased.

The manipulator may be programmable in three or more axes, such as in six or seven axes. The manipulator may comprise a motor and a gearbox at each joint. The joints may be rotational and/or translational joints.

The candidate trajectory may be provided in various ways. The candidate trajectory may be input by a user or may be generated by a robot program implemented in a control system of the industrial robot.

The at least one position dependent load may comprise one or more forces acting on a mechanical component of the manipulator, and/or one or more torques acting on the mechanical component of the manipulator. The determination of the at least one position dependent load value representative of at least one position dependent load acting on the manipulator for the candidate trajectory may thus comprise checking the position dependent components of force and torque. The determination of the at least one position dependent load value may be made at each time instant, e.g. at a frequency of at least 10 Hz, such as 100 Hz.

The modification of the candidate trajectory based on the at least one position dependent load value to provide the modified trajectory may be made based on a substantially optimal, or optimal, lifetime of one or more mechanical component of the manipulator. The method may further comprise informing a user of how the candidate trajectory is modified to provide the modified trajectory.

The at least one position dependent load may comprise a gravity load. Alternatively, or in addition, the at least one position dependent load may comprise position dependent forces and/or torques from one or more springs acting on the manipulator.

The modification of the candidate trajectory to provide the modified trajectory may comprise modifying one or more of a speed of one or more joints, an acceleration of one or more joints and/or a path of the candidate trajectory. For example, the speed and the acceleration may be limited for the modified trajectory, e.g. when the total load is increased to allow additional force or torque. The method may further comprise informing the user, e.g. via a display, that the speed is limited and/or that the acceleration is limited.

The method may further comprise providing a model describing static and dynamic properties of the manipulator, the model having a position dependent load term; determining the at least one position dependent load value for the candidate trajectory based on the position dependent load term; determining a load constraint of a load parameter for a mechanical component of the manipulator based on the at least one position dependent load value; and determining the modified trajectory for the manipulator by solving an optimization problem having an objective function and the load constraint. The load parameter may be the total load as described above. The load parameter may be a force or a torque.

The objective function may for example be to minimize time, but it could alternatively be to minimize energy consumption, noise or mechanical fatigue. The at least one position dependent load value, the load constraint and the modified trajectory may be repeatedly determined, e.g. at each time instant, by means of dynamic optimization.

The model enables the load impact at an arbitrary part of the manipulator to be determined for each candidate trajectory. Thus, the model enables dedicated sensors for measuring loads on the manipulator to be eliminated. By determining the load constraint based on the at least one position dependent load value, the positions, speeds and accelerations of the manipulator can be adjusted to provide a dynamic workspace that depends on the at least one position dependent load. The load constraint may be determined based on a substantially optimal, or optimal, lifetime of one or more mechanical component of the manipulator.

The model may comprise one or more inertia dependent terms defining an inertia of the manipulator; one or more centripetal terms defining a centripetal load of the manipulator; one or more gravity dependent terms defining a gravity load of the manipulator; and/or one or more friction dependent terms defining a friction load of each joint. Each inertia dependent term may depend on a position and/or acceleration of one, several or all of the joints. Each centripetal term may depend on a position and/or a speed of one, several or all of the joints. Each gravity dependent term may depend on a position of one, several or all of the joints.

The load constraint may be determined as a relatively low load constraint value when a position dependent load value of the position dependent load term is below a position dependent load threshold. The load constraint may be determined as a relatively high load constraint value when the position dependent load value is above the position dependent load threshold. The method may further comprise informing the user, e.g. via a display, that the load constraint is determined as a relatively high load constraint value, that the position dependent load term is above the position dependent load threshold, that the speed is limited and/or that the acceleration is limited. The user can thus be informed of when the manipulator increases one performance parameter at the cost of another performance parameter.

The at least one position dependent load value may be determined for the manipulator when carrying a payload. Thus, the method may take the payload into consideration when determining the at least one position dependent load value for the candidate trajectory and when modifying the candidate trajectory to provide the modified trajectory. The method however also has advantages, such as an extended workspace, when the manipulator does not carry a payload.

According to a further aspect, there is provided a control system for controlling a manipulator of an industrial robot having a plurality of joints, the control system comprising at least one data processing device and at least one memory having a computer program stored thereon, the computer program comprising program code which, when executed by the at least one data processing device, causes the at least one data processing device to perform the steps of providing a candidate trajectory for the manipulator; determining at least one position dependent load value representative of at least one position dependent load acting on the manipulator for the candidate trajectory; modifying the candidate trajectory based on the at least one position dependent load value to provide a modified trajectory; and commanding the manipulator to execute the modified trajectory.

The at least one position dependent load may comprise a gravity load.

The modification of the candidate trajectory to provide the modified trajectory may comprise modifying one or more of a speed of one or more joints, an acceleration of one or more joints and/or a path of the candidate trajectory.

The computer program may comprise program code which, when executed by the at least one data processing device, causes the at least one data processing device to perform the steps of providing a model describing static and dynamic properties of the manipulator, the model having a position dependent load term; determining the at least one position dependent load value for the candidate trajectory based on the position dependent load term; determining a load constraint of a load parameter for a mechanical component of the manipulator based on the at least one position dependent load value; and determining the modified trajectory for the manipulator by solving an optimization problem having an objective function and the load constraint.

The model may comprise one or more inertia dependent terms defining an inertia of the manipulator; one or more centripetal terms defining a centripetal load of the manipulator; one or more gravity dependent terms defining a gravity load of the manipulator; and/or one or more friction dependent terms defining a friction load of each joint.

The load constraint may be determined as a relatively low load constraint value when a position dependent load value of the position dependent load term is below a position dependent load threshold. The load constraint may be determined as a relatively high load constraint value when the position dependent load value is above the position dependent load threshold.

The at least one position dependent load value may be determined for the manipulator when carrying a payload.

According to a further aspect, there is provided an industrial robot comprising a manipulator and a control system according to the present disclosure.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
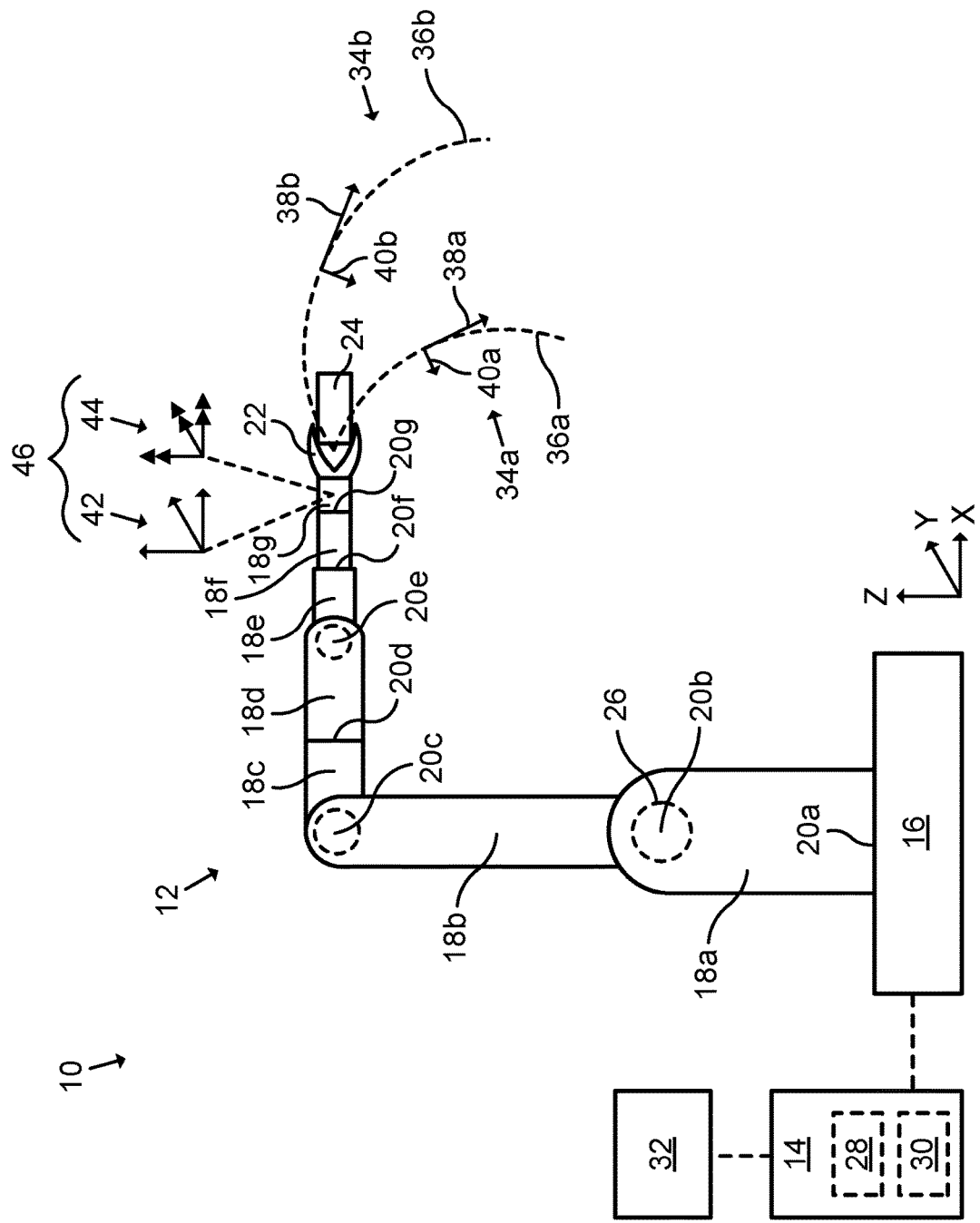
FIG. 1: schematically represents a side view of an industrial robot comprising a manipulator.

In the following, a method of controlling a manipulator of an industrial robot having a plurality of joints, a control system for controlling a manipulator of an industrial robot having a plurality of joints, and an industrial robot comprising a manipulator and a control system, will be described. The same or similar reference numerals will be used to denote the same or similar structural features.

FIG. 1 schematically represents a side view of an industrial robot 10. The industrial robot 10 comprises a manipulator 12 and a control system 14. The industrial robot 10 further comprises a base 16. The manipulator 12 is movable relative to the base 16. FIG. 1 further shows a Cartesian coordinate system X, Y, Z for reference purposes.

The manipulator 12 of this specific example comprises seven axes. The manipulator 12 comprises a first link 18$a$ rotatable relative to the base 16 at a first joint 20$a$, a second link 18$b$ rotatable relative to the first link 18$a$ at a second joint 20$b$, a third link 18$c$ rotatable relative to the second link 18$b$ at a third joint 20$c$, a fourth link 18$d$ rotatable relative to the third link 18$c$ at a fourth joint 20$d$, a fifth link 18$e$ rotatable relative to the fourth link 18$d$ at a fifth joint 20$e$, a sixth link 18$f$ translationally movable relative to the fifth link 18$e$ at a sixth joint 20$f$, and a seventh link 18$g$ rotatable relative to the sixth link 18$f$ at a seventh joint 20$g$. One, several or all of the links 18$a$-18$g$ may alternatively be referred to with reference numeral "18". One, several or all of the joints 20$a$-20$g$ may alternatively be referred to with reference numeral "20".

The manipulator 12 further comprises an end effector or tool, here exemplified as a gripper 22. As shown in FIG. 1, the manipulator 12 carries a payload 24 by means of the gripper 22. The payload 24 may be an item to be moved by the manipulator 12, e.g. in a pick and place operation.

FIG. 1 further shows three bearings 26, one at each of the second joint 20$b$, the third joint 20$c$ and the fifth joint 20$e$. One bearing 26 may however be provided at each joint 20. Each link 18 is driven at its joint 20 by means of an associated motor and an associated gearbox. The joints 20, the links 18, the bearings 26, the electric motors and the gearboxes are examples of mechanical components of the manipulator 12.

The control system 14 is in signal communication with the manipulator 12 for controlling operations thereof. The control system 14 may for example be a robot controller. The control system 14 comprises a data processing device 28 and a memory 30. The memory 30 has a robot program stored thereon. The robot program comprises program code which, when executed by the data processing device 28, causes the data processing device 28 to perform, and/or command performance of, various steps as described herein.

The industrial robot 10 of this example further comprises a display 32 for displaying various information related to the operation of the industrial robot 10. The display 32 may for example be provided in a teach pendant unit, TPU. The display 32 is in signal communication with the control system 14.

In FIG. 1, a candidate trajectory 34$a$ is shown. The candidate trajectory 34$a$ comprises an associated path 36$a$, an associated speed 38$a$ and an associated acceleration 40$a$, as schematically illustrated in FIG. 1. A trajectory thus differs from a path by comprising more information than merely the path, such as a speed profile and/or an acceleration profile along the path. The candidate trajectory 34$a$ may also be considered to include the payload 24. The path 36$a$ may for example be followed by a tool center point, TCP, if executing the candidate trajectory 34$a$.

The robot program comprises software for generating candidate trajectories 34$a$ and for optimizing the candidate trajectories 34$a$ with a dynamic optimization to provide modified trajectories 34b. One or more candidate trajectories 34a may alternatively be input by a user. At each time instant, the candidate trajectory 34a is evaluated, e.g. by means of a look-ahead function implemented in the robot program. As schematically shown in FIG. 1, also the modified trajectory 34b comprises an associated path 36b, an associated speed 38b and an associated acceleration 40b. The speeds 38a and 38b may alternatively be referred to with reference numeral "38". The accelerations 40a and 40b may alternatively be referred to with reference numeral "40".

FIG. 1 further schematically shows forces 42 and torques 44 acting at a particular mechanical component of the manipulator 12, here at the gripper 22. For each candidate trajectory 34a, the resulting forces 42 and torques 44 can be calculated at one or more arbitrarily chosen points of the manipulator 12. The forces 42 and torques 44 are collectively referred to as load parameters 46. Since the load parameters 46 can be calculated, no dedicated sensors are needed for measuring the load parameters 46. A further example of a load parameter 46 is stress.

In order to meet structural integrity specifications on the mechanical components of the manipulator 12, both static loads and dynamic loads need to be considered when executing a trajectory by the manipulator 12. The dynamic loads are typically reduced to levels substantially below the static load capacities to avoid fatigue of the mechanical components. Moreover, maximum dynamic loads may be specified for mechanical components for several different dynamic load cases. For example, the bearing 26 at the first joint 20a may have a unique specified limit on bending moment at each of a low speed 38 and a high speed 38. When the gripper 22 is close to the base 16, the position dependent bending moment at the first joint 20a is low. A relatively large part of the bending moment limit of the bearing 26 at the first joint 20a can thereby be used for speed dependent terms or to accelerate the manipulator 12. When the manipulator 12 is stretched out and the payload 24 is heavy, the position dependent bending moments are very high at the first joint 20a. To prevent overload in this case, the speed dependent forces 42 and torques 44 at the first joint 20a, and the acceleration dependent forces 42 and torques 44 at the first joint 20a must be kept low.

Given a proposed candidate trajectory 34a, a vector $\tau_k$ comprising one or more load parameters 46 can be calculated in every timestep along the associated path 36a by means of a model of the manipulator 12 as:

$$\tau_k = \tau_{k,\ddot{q}} + \tau_{k,\dot{q}} + \tau_{k,q} \quad (1)$$

where $\tau_k$ is a vector of forces 42 and torques 44 when considering the complete dynamics of the manipulator 12 or a vector of three forces 42 and three torques 44, also referred to as a wrench, when expressing the dynamics with respect to one cross section, a joint 20 or some other coordinate system in the structure of the manipulator 12.

The vector q and its derivatives represent the positions of the joints 20, the speeds 38 of the joints 20 and the accelerations 40 of the joints 20.

$\tau_{k,\ddot{q}}$ is a n acceleration term of the model that may alternatively be written as $M_k(q)\ddot{q}$.

$M_k(q)$ is the inertia matrix which depends on the positions of the joints 20. The inertia matrix is one example of an inertia dependent term defining an inertia of the manipulator 12.

$\tau_{k,\dot{q}}$ is a speed term of the model that may alternatively be written as $C_k(q,\dot{q})\dot{q}$.

$C_k(q,\dot{q})$ represents the centripetal effect and is one example of a centripetal term defining a centripetal load of the manipulator 12.

$\tau_{k,q}$ is a position term of the model that may alternatively be written as $g_k(q)$.

$g_k(q)$ represents a position dependent load term of the manipulator 12, here exemplified as a gravity dependent load term. The model thus describes both static and dynamic properties of the manipulator 12.

Equation (1) can thus alternatively be written as:

$$\tau_k = M_k(q)\ddot{q} + C_k(q,\dot{q})\dot{q} + g_k(q)$$

In addition, a friction term can also be added to the model. Such friction term typically depends on the speeds 38 of the joints 20 but could also depend on the positions of the joints 20.

By means of the model, load parameters 46 can be calculated at arbitrary points in the manipulator 12 for any candidate trajectory 34a.

By considering the model in equation (1), it is clear that $T_k$ can be reduced by reducing the influence from the speeds 38 and accelerations 40. However, since each of $M_k$, $C_k$ and $g_k$ is a function of the positions of the joints 20, the speeds 38 and accelerations 40 need to be very conservative to provide a guaranteed limit of $T_k$. In addition, the payload 24 also has a large effect on $M_k$, $C_k$ and $g_k$. The method according to the present disclosure enables a simpler, but still not conservative, way to modify the speeds 38 and accelerations 40 of the manipulator 12 based on the model (1) in view of lifetime of specific mechanical components.

The optimization of the candidate trajectories 34a to provide modified trajectories 34b is here performed with a number of constraints that need to be satisfied in the optimal solution. Equation (1) is included in the optimization as a load parameter, where:

$$a_{k,min} \leq \tau_k \leq a_{k,max} \quad (2)$$

where the vector inequality is interpreted as a component wise inequality, where $a_{k,min}$ is the lower limit of the respective load parameter 46 and $a_{k,max}$ is the upper limit of the respective load parameter 46. The limits of the load constraint are determined as a function of one or more position dependent load terms, here the gravity term $g_k$.

It is also possible to add norm constraints to the optimization, according to:

$$\|\tau_k\| \leq b_{k,max} \quad (3)$$

where $b_{k,max}$ is the upper level of the norm of the force 42 or the torque 44. The upper limit can in general be a constant, but here the upper limit is determined in dependence of the gravity component $g_k(q)$.

The optimization process then calculates feasible solutions to $\dot{q}$ and $\ddot{q}$ where the load constraints $a_{k,min}$ and $a_{k,max}$ and the norm constraints $b_{k,max}$ are fulfilled. In the optimization, $T_k$ is replaced by equation (1).

The number of constraints can be arbitrary since the coordinate systems k can be arbitrarily many and in each coordinate system, it is possible to have constraints for each component and for the norm of force 42 and torque 44. It is also possible to introduce norm constraints for only the components in one plane, for example the forces 42 acting in the XY-plane.

Since the optimization is solved in discrete time over a finite horizon, the value of $T_k$ is evaluated in a finite number of time instances which will depend on the sample time in the optimization problem and the choice of optimization method. The time distance may for example be 1 ms to 50 ms.

Since the path is given for the candidate trajectory 34a, when the calculated position dependent load values $g_k(q)$ in a timestep results in a value that is near to $a_{k,max}$, $\tau_{k,\dot{q}}+\tau_{k,\dot{q}}$ must be small, zero or negative for the inequality $a_{k,min} \leq \tau_k \leq a_{k,max}$ to be fulfilled. If in this case, $a_{k,max}$ can be increased, there are more solution space for $\dot{q}$ and $\ddot{q}$.

Figure 2:
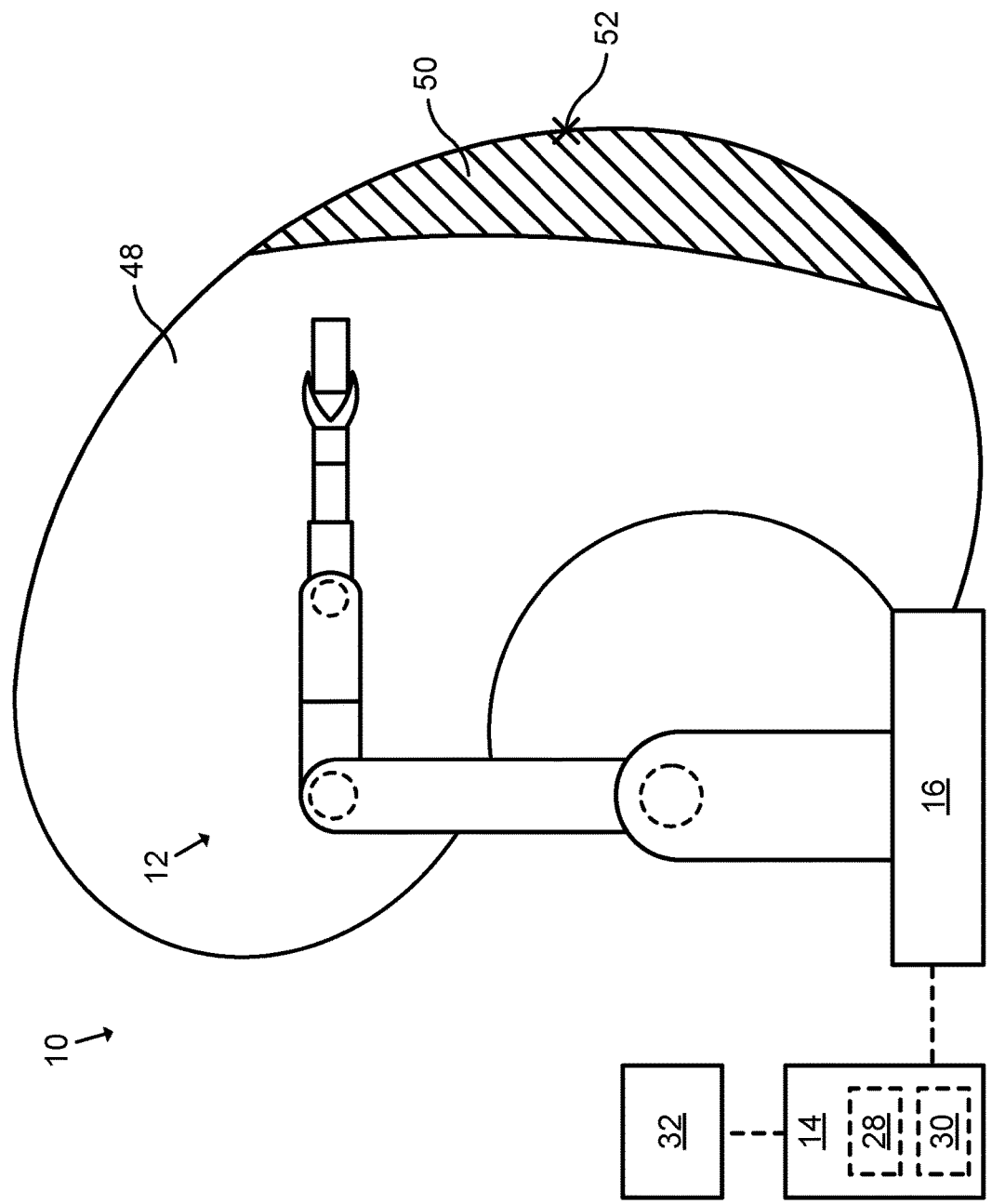
FIG. 2: schematically represents an extended workspace for the manipulator.

FIG. 2 schematically represents the industrial robot 10, a normal workspace 48 reachable with prior art solutions, and an extended workspace 50 reachable by the method according to the present disclosure. FIG. 2 further shows a position 52 at an outer bound of the extended workspace 50, which the manipulator 12 can reach and move in due to the method as described herein.

In case the gravity component $g_k(q)$ is relatively high or relatively close to the load constraint, the limits of the load constraint $a_{k,min}$ and $a_{k,max}$ are extended by the robot program. That is, the lower load constraint $a_{k,min}$ is reduced and the upper load constraint $a_{k,max}$ is increased. By modifying the load constraint in this way, the method allows the load parameters 46 to increase while still meeting the dynamic load limits of the mechanical components regarding lifetime and without having to define specific limits on speeds 38 and/or accelerations 40. If for example speeds 38 of the joints 20 are limited to fixed values, the speeds 38 are likely reduced more than necessary, which in turn reduces cycle time and performance of the manipulator 12.

The extension of the load constraint enables performance parameters to be increased. For example, the manipulator 12 is enabled to move from a normal workspace 48 and into the extended workspace 50, but with reduced performance, such as with limited speed 38 and/or acceleration 40. The reason for allowing this extension of the load constraint is that the maximum load values of the load parameters 46 are not static, but depend on to what extent position dependent loads contribute to the load parameters 46. Exactly how the load constraint is modified based on the gravity component $g_k(q)$ is part of the design and tuning of the manipulator 12. This is done in the product development process. Various parameters for adjusting this dependency could be part of an open configuration. In this case, an advanced user of the control system 14 can adjust the dependency and be able to further extend the workspace of the manipulator 12.

Without the method, the rating of many mechanical components of the manipulator 12, such as the bearings 26, would have to be increased in order for the manipulator 12 to reach and move in the extended workspace 50. Not only would this increase costs, but this would also lead to a poor utilization of the maximum performance level of the manipulator 12 in the normal workspace 48.

As an alternative to extending the workspace, the method enables the manipulator 12 to carry a heavier payload 24. The speeds 38 and accelerations 40 of the manipulator 12 then have to be reduced at extended positions, but not necessarily at positions closer to the base 16. The payload 24 may for example be increased from 500 kg to 750 kg.

As an alternative to determining the load constraint for the optimization problem based on at least one position dependent load, position dependent load values may be determined for the candidate trajectory 34a. In case the position dependent load value for one or more joints 20 is above a position dependent load threshold, the speed 38 and the acceleration 40 may be limited for that joint 20 in the modified trajectory 34b.

Figure 3:
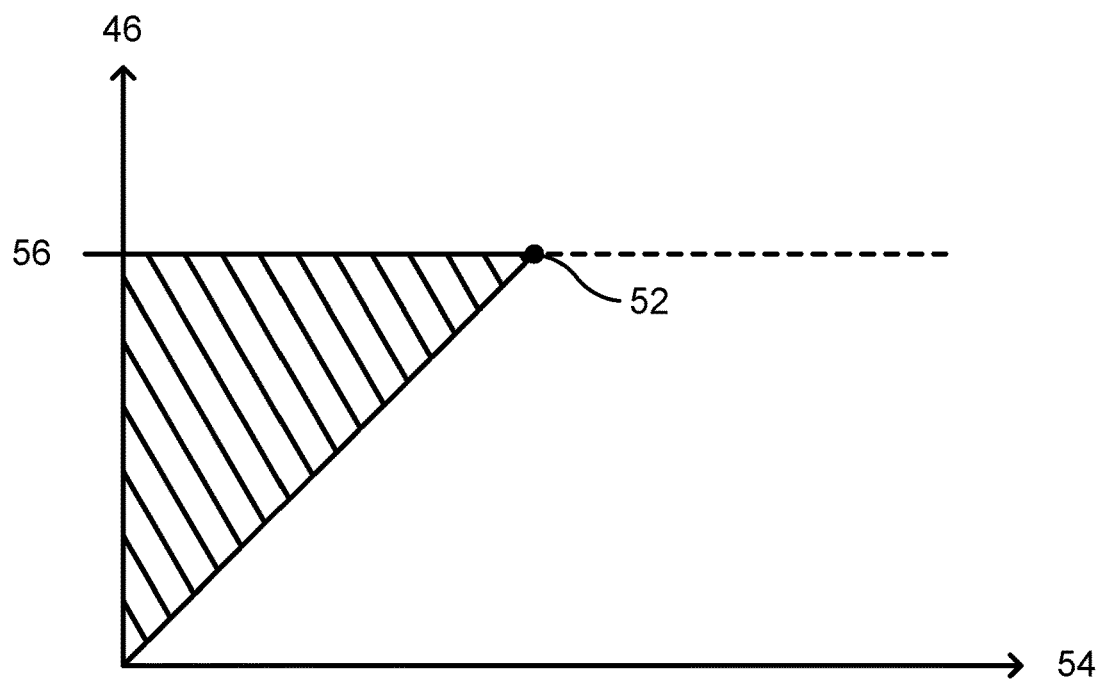
FIG. 3: schematically represents a load parameter of the manipulator as a function of distance when not using a method as described herein.

FIG. 3 schematically represents a load parameter 46 of the manipulator 12 as a function of distance 54 of the gripper 22 from the base 16 when not using the method as described herein. The load parameter 46 may for example be force 42 or torque 44. The hatched area represents loads available for dynamic loads, such as speeds 38 and accelerations 40. FIG. 3 further shows a constant and conservative limit 56 of the load parameter 46, e.g. as calculated with equation (1). At position 52 (c.f. FIG. 2), the position dependent loads correspond to the constant and conservative limit 56 of the load parameter 46. Thus, no speed 38 and acceleration 40 is available at position 52. This is the reason for using the smaller normal workspace 48 shown in FIG. 2 in prior art solutions.

Figure 4:
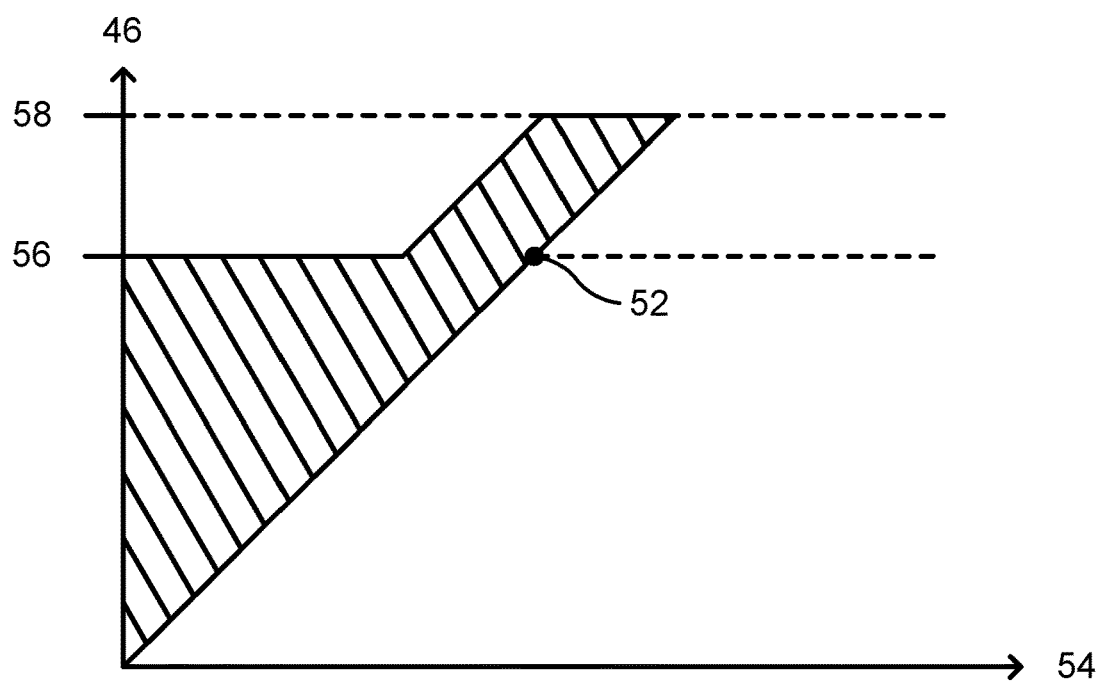
FIG. 4: schematically represents the load parameter of the manipulator as a function of distance when using the method as described herein.

FIG. 4 schematically represents the load parameter 46 of the manipulator 12 as a function of the distance 54 when using the method as described herein. At position 52, the position dependent load values are relatively high. The method therefore increases the load constraint of the load parameter 46 to allow for speed 38 and acceleration 40 at the position 52. This can be done without exceeding the structural integrity specifications of the manipulator 12 since dynamic loads are more critical than static loads. As a result, the manipulator 12 can operate in the extended workspace 50, but with reduced speed 38 and acceleration 40. In FIG. 4, a limit 58 is shown representing a performance limitation, e.g. of the electric motors in the joints 20. Information associated with this increase of the load constraint may be shown to a user via the display 32.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of controlling a manipulator of an industrial robot having a plurality of joints the method comprising:
   providing a candidate trajectory for the manipulator;
   determining at least one position dependent load value representative of at least one position dependent load acting on the manipulator for the candidate trajectory;
   modifying the candidate trajectory based on the at least one position dependent load value to provide a modified trajectory; and
   executing the modified trajectory by the manipulator,
   wherein the method further includes:
   providing a model describing static and dynamic properties of the manipulator, the model having a position dependent load term;
   determining the at least one position dependent load value for the candidate trajectory based on the position dependent load term;
   determining a load constraint of a load parameter for a mechanical component of the manipulator based on the at least one position dependent load value; and
   determining the modified trajectory for the manipulator by solving an optimization problem having an objective function and the load constraint; and
   wherein the load constraint is determined as a relatively low load constraint value when a position dependent load value of the position dependent load term is below a position dependent load threshold, and determined as a relatively high load constraint value when the position dependent load value is above the position dependent load threshold.

2. The method according to claim 1, wherein the at least one position dependent load comprises a gravity load.

3. The method according to claim 2, wherein the modification of the candidate trajectory to provide the modified trajectory includes modifying one or more of a speed of one or more joints, an acceleration of one or more joints and/or a path of the candidate trajectory.

4. The method according to claim 2, wherein the model comprises:
one or more inertia dependent terms defining an inertia of the manipulator;
one or more centripetal terms defining a centripetal load of the manipulator;
one or more gravity dependent terms defining a gravity load of the manipulator; and/or
one or more friction dependent terms defining a friction load of each joint.

5. The method according to claim 2, wherein the at least one position dependent load value is determined for the manipulator when carrying a payload.

6. The method according to claim 1, wherein the modification of the candidate trajectory to provide the modified trajectory includes modifying one or more of a speed of one or more joints, an acceleration of one or more joints and/or a path of the candidate trajectory.

7. The method according to claim 1, wherein the model comprises:
one or more inertia dependent terms defining an inertia of the manipulator;
one or more centripetal terms defining a centripetal load of the manipulator;
one or more gravity dependent terms defining a gravity load of the manipulator; and/or
one or more friction dependent terms defining a friction load of each joint.

8. The method according to claim 1, wherein the at least one position dependent load value is determined for the manipulator when carrying a payload.

9. A control system for controlling a manipulator of an industrial robot having a plurality of joints, the control system comprising at least one data processing device and at least one memory having a computer program stored thereon, the computer program including program code which, when executed by the at least one data processing device, causes the at least one data processing device to perform the steps of:
providing a candidate trajectory for the manipulator;
determining at least one position dependent load value representative of at least one position dependent load acting on the manipulator for the candidate trajectory;
modifying the candidate trajectory based on the at least one position dependent load value to provide a modified trajectory; and
commanding the manipulator to execute the modified trajectory,
wherein the computer program, when executed by the at least one data processing device, causes the at least one data processing device to further perform the steps of:
providing a model describing static and dynamic properties of the manipulator, the model having a position dependent load term;
determining the at least one position dependent load value for the candidate trajectory based on the position dependent load term;
determining a load constraint of a load parameter for a mechanical component of the manipulator based on the at least one position dependent load value; and
determining the modified trajectory for the manipulator by solving an optimization problem having an objective function and the load constraint; and wherein the load constraint is determined as a relatively low load constraint value when a position dependent load value of the position dependent load term is below a position dependent load threshold, and determined as a relatively high load constraint value when the position dependent load value is above the position dependent load threshold.

10. The control system according to claim 9, wherein the at least one position dependent load comprises a gravity load.

11. The control system according to claim 10, wherein the modification of the candidate trajectory to provide the modified trajectory comprises modifying one or more of a speed of one or more joints, an acceleration of one or more joints and/or a path of the candidate trajectory.

12. The control system according to claim 10, wherein the model comprises:
one or more inertia dependent terms defining an inertia of the manipulator;
one or more centripetal terms defining a centripetal load of the manipulator;
one or more gravity dependent terms defining a gravity load of the manipulator; and/or
one or more friction dependent terms defining a friction load of each joint.

13. The control system according to claim 10, wherein the at least one position dependent load value is determined for the manipulator when carrying a payload.

14. The control system according to claim 9, wherein the modification of the candidate trajectory to provide the modified trajectory comprises modifying one or more of a speed of one or more joints, an acceleration of one or more joints and/or a path of the candidate trajectory.

15. The control system according to claim 9, wherein the model comprises:
one or more inertia dependent terms defining an inertia of the manipulator;
one or more centripetal terms defining a centripetal load of the manipulator;
one or more gravity dependent terms defining a gravity load of the manipulator; and/or
one or more friction dependent terms defining a friction load of each joint.

16. The control system according to claim 9, wherein the at least one position dependent load value is determined for the manipulator when carrying a payload.

17. An industrial robot comprising a manipulator and a control system for controlling the manipulator of the industrial robot having a plurality of joints, the control system comprising at least one data processing device and at least one memory having a computer program stored thereon, the computer program including program code which, when executed by the at least one data processing device, causes the at least one data processing device to perform the steps of:
providing a candidate trajectory for the manipulator;
determining at least one position dependent load value representative of at least one position dependent load acting on the manipulator for the candidate trajectory;
modifying the candidate trajectory based on the at least one position dependent load value to provide a modified trajectory; and
commanding the manipulator to execute the modified trajectory,
wherein the computer program, when executed by the at least one data processing device, causes the at least one data processing device to further perform the steps of:

providing a model describing static and dynamic properties of the manipulator, the model having a position dependent load term;

determining the at least one position dependent load value for the candidate trajectory based on the position dependent load term;

determining a load constraint of a load parameter for a mechanical component of the manipulator based on the at least one position dependent load value; and determining the modified trajectory for the manipulator by solving an optimization problem having an objective function and the load constraint; and wherein the load constraint is determined as a relatively low load constraint value when a position dependent load value of the position dependent load term is below a position dependent load threshold, and determined as a relatively high load constraint value when the position dependent load value is above the position dependent load threshold.

* * * * *